Figure 1:
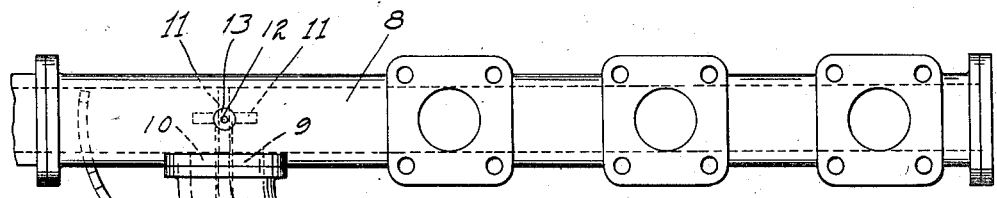

S. H. PAGE & C. J. BELDEN.
GASIFIER FOR LIQUID FUELS.
APPLICATION FILED JAN. 10, 1913.

1,065,964.

Patented July 1, 1913.

WITNESSES:

INVENTORS
S. H. Page
C. J. Belden
BY
ATTORNEY

UNITED STATES PATENT OFFICE.

STANLEY H. PAGE AND CHARLES J. BELDEN, OF SAN FRANCISCO, CALIFORNIA, ASSIGNORS TO UNION GAS ENGINE COMPANY, OF SAN FRANCISCO, CALIFORNIA, A CORPORATION OF CALIFORNIA.

GASIFIER FOR LIQUID FUELS.

1,065,964.  Specification of Letters Patent.  Patented July 1, 1913.

Application filed January 10, 1913. Serial No. 741,205.

*To all whom it may concern:*

Be it known that we, STANLEY H. PAGE and CHARLES J. BELDEN, citizens of the United States, residing in the city and county of San Francisco and State of California, have invented certain new and useful Improvements in Gasifiers for Liquid Fuels, of which the following is a specification.

The present invention relates to improvements in apparatus for gasifying low grade liquid fuels, such as distillates, so that the same may be employed for successfully operating internal combustion engines, to dispense with gasolene which is now universally employed for this purpose.

The invention has for its principal object to provide an inlet manifold with an independent valve controlled passage leading from a source of supply and to each cylinder and to surround said passages with a common duct or channel through which the exhaust gases from the engine cylinders circulate, before the same are directed to the atmosphere.

A further object is to provide a valve controlled air regulated inlet passage adjacent said exhaust gas circulating channel, and communicating with the discharge end of said valve controlled passages, for supplying heated air to said fuel before the same enters the cylinders.

Another object is to provide a valve between the exhaust pipe and the inlet manifold for varying the flow of exhaust gases therefrom, into the duct or channel surrounding the inlet chamber, according to the density of the explosive fuel employed, so that the inlet manifold will always be maintained at the proper temperature to thoroughly gasify the fluid and heat the air before the same are intermixed and are drawn into the engine cylinders.

With the foregoing and other objects in view, the invention consists in the novel combination of parts hereinafter more specifically described, illustrated in the accompanying drawings, and particularly pointed out in the claims hereto appended.

In describing the invention in detail, reference is had to the accompanying drawings forming a part of the specification, wherein like reference characters denote corresponding parts throughout the several views, and in which—

Figure 2:
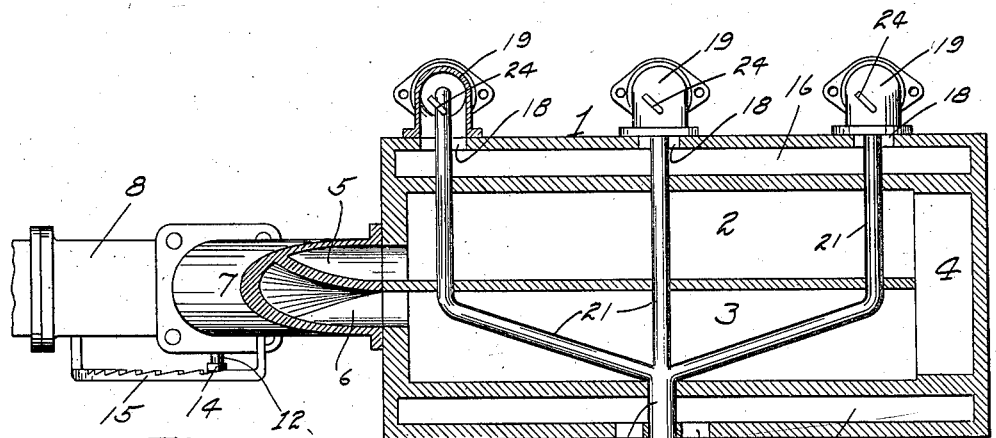
Figure 3:
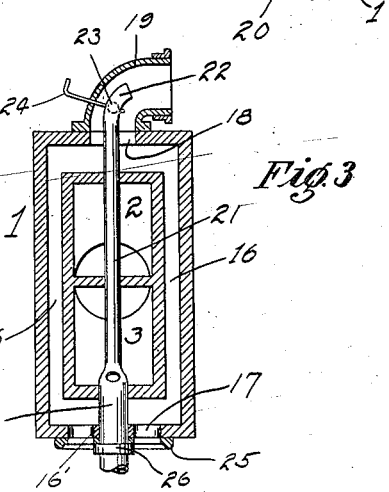

Figure 1 is a plan view, disclosing the exhaust pipe, the inlet manifold, the valve controlled connection between the exhaust pipe and inlet manifold, and one of the valve controlled fuel feed pipes. Fig. 2 is a side elevation partly in section, disclosing the exhaust gas circulating passage in the manifold, the valve controlled fuel feed pipes extending therethrough, and the valve controlled air intake surrounding the exhaust gas circulating passage and communicating with the discharge end of the fuel feed pipes. Fig. 3 is a sectional view of Fig. 1, disclosing the exhaust gas circulating passage, one of the valve controlled fuel feed pipes, and the valve controlled air intake surrounding the gas circulating passage.

Referring more particularly to the drawings, the reference numeral 1 designates our improved inlet manifold, preferably cast in a single piece, from any suitable material, and preferably oblong in shape. Extending longitudinally of the interior of the manifold and arranged in spaced relation to the side walls thereof are the separate passages or ducts 2 and 3, communicating with each other at one end of the manifold through the passage 4, and each communicating at the opposite end with the respective channels 5 and 6 arranged spirally within a suitable tubular member 7, which at its opposite end communicates with the interior of an exhaust manifold 8 of the engine, through suitable ports 9 and 10 arranged in one side thereof.

The exhaust manifold 8 is of the usual construction and is provided in its center in a line between the ports 9 and 10 with a butterfly valve 11, which is of the same diameter as the interior of the exhaust manifold, and extending through the center of said valve is a shaft 12, the upper end of which is pivotally mounted in a seat 13 arranged on the interior of the exhaust manifold, and the opposite end of said shaft extends outwardly through a suitable opening in the exhaust manifold and is bent at right angles to the shaft 12, forming an operating handle 14. The handle 14 engages in its path of movement a suitable arcuate segment 15, the ends of which are preferably secured to the pipes 7 and 8.

By rotatably mounting the valve 11 in the exhaust manifold 8 the flow of the exhaust gases therefrom will be directed through the port 9 into the passage 5 of the pipe 7, and into the duct 2 of the inlet manifold and will circulate through the passage 4 into the duct 3, passing therefrom into the exhaust manifold in rear of the valve 11, through the channel 6 and opening 10.

Formed within the inlet manifold 1 and surrounding the side, top and bottom walls of the ducts 2 and 3 is an air intake passage or channel 16, communicating with the atmosphere at the bottom of the manifold through an opening 17, and communicating with each of the engine cylinders through separate passages 18, over which are placed the elbows or hoods 19 which communicate with the inlet valve of the respective cylinders.

Extending upwardly through a spider 16' in which are formed the openings 17, is a fuel feed pipe 20 connected at its receiving end to any suitable source of fuel supply, and said pipe terminates at its upper end in a plurality of branch pipes 21, each of which extends upwardly through the passages or ducts 2 and 3, and project at their discharge ends through the passages 18, and terminate in the hoods or elbows 19. The discharge ends 22 of the branch pipes 21 are provided with independently operatable controlling valves 23, positioned therein and said valves are actuated through a stem or handle 24 which extends outwardly through the elbow 19. By adjusting the valves 23, a uniform explosive charge will be drawn into each cylinder, regardless of whether one piston has a greater suction than another. The admission of air through the openings 17 is regulated by a ported valve plate 25, rotatably mounted on the fuel feed pipe 20 adjacent said openings 17, and retained in position by a collar 26 secured to said inlet pipe.

The circulation of the exhaust gases through the passages in the inlet manifold will cause the walls thereof to become highly heated and will also heat the branch pipes 21 which extend therethrough, and as the fuel is drawn through the branch pipes the same is heated to a high degree of temperature and is quickly vaporized, leaving the discharge end of the branch pipes and entering the elbows or hoods 19 in a state of high temperature, where it intermixes with the air, which has entered the openings 17, circulated through the passages 16 and has become highly heated by contact with the walls of the channels or ducts 2 and 3.

It will be observed that by pivotally mounting the valve 11 in the exhaust pipe, that the entire exhaust from the engine or any portion thereof, may be directed into the channels or ducts 2 and 3, thus adapting the device to the gasifying of all low grade liquid fuels, and that a continuous circulation of exhaust gases is always maintained in said channels or ducts 2 and 3, when desired.

The engine is preferably started by any highly combustible fuel, such as gasolene, the exhaust gases therefrom being directed by the valve 11 through the channels or ducts 2 and 3; and after the channels have become sufficiently heated to gasify the fuel to be employed in the operation of the engine, the flow of the lighter fluid may be cut off from the inlet pipe 20 and the operating fluid admitted thereto.

We claim:

1. In a gasifying device for liquid fuels, the combination with an exhaust pipe of an internal combustion engine, an inlet manifold, a heat circulating duct in said manifold, the inlet and outlet for said duct being arranged at the same end of said manifold so that the circulation of the heated gases from the exhaust pipe will travel through said duct and return to said exhaust pipe, a fuel feed pipe extending through said duct, a valve controlling the discharge end of said pipe, a communication between said pipe and a source of fuel supply, a communication between said pipe and the engine cylinder, a valve controlled air feed passage in said manifold surrounding said heat circulating duct, said air feed passage and said fuel feed pipe discharging into said communication between said fuel feed pipe and the engine cylinder.

2. In a gasifying device for low gravity liquid fuels, the combination with an exhaust pipe of an internal combustion engine, an inlet manifold, a heat circulating duct in said manifold, the inlet and outlet of said duct being so arranged that the circulation of the heated gases from said exhaust pipe will travel through said duct, a plurality of fuel feed pipes extending through said duct and communicating with the engine cylinders, a communication between said pipes and a source of fluid supply, and an air feed passage in said manifold adjacent said heat circulating duct, said air feed passage and said fuel feed pipes discharging into said communications between said fuel feed pipes and said engine cylinders.

3. In a gasifying device for low gravity liquid fuels, the combination with an exhaust pipe of an internal combustion engine, an inlet manifold, a heat circulating duct in said manifold, the inlet and outlet of said duct being so arranged that the circulation of the heated gases from said exhaust pipe will travel through said duct, a plurality of fuel feed pipes extending through said duct and communicating with the engine cylinders, a communication between said pipes and a source of fluid supply, an independently operated valve controlling the discharge end of each of said fuel feed pipes, and an air feed passage in said manifold adjacent said heat circulating duct, said air feed passage and said fuel feed pipes discharging into said communications between said fuel feed pipes and the engine cylinders.

4. In a gasifying device for low gravity liquid fuels, the combination with an exhaust pipe of an internal combustion engine, an inlet manifold, a heat circulating duct in said manifold, the inlet and outlet of said duct being so arranged that the circulation of the heated gases from said exhaust pipe will travel through said duct, a plurality of fuel feed pipes extending through said duct and communicating with the engine cylinders, a communication between said pipes and a source of fluid supply, an independently operated valve controlling the discharge end of each of said fuel feed pipes, and a valve controlled air feed passage in said manifold adjacent said heat circulating duct, and said air feed passage and said fuel feed pipes discharging into said communications between said fuel feed pipes and the engine cylinders.

5. In a gasifying device for low gravity liquid fuels, the combination with an exhaust pipe of an internal combustion engine, an inlet manifold, a heat circulating duct in said manifold, the inlet and outlet for said duct being so arranged that the circulation of the heated gases from the exhaust pipe will travel therethrough and return to the exhaust pipe, a plurality of fuel feed pipes extending through said duct and communicating with the engine cylinders, a communication between said pipes and a source of fuel supply, an independently operated valve controlling the discharge end of each of said fuel feed pipes, and an air feed passage surrounding said heat circulating duct and said air feed passage and said fuel feed pipes discharging into said communications between said fuel feed pipes and the engine cylinders.

6. In a gasifying device for low gravity liquid fuels, the combination with an exhaust pipe of an internal combustion engine, an inlet manifold, a heat circulating duct in said manifold, the inlet and outlet for said duct being so arranged that the circulation of the heated gases from the exhaust pipe will travel therethrough and return to the exhaust pipe, a plurality of fuel feed pipes extending through said duct and communicating with the engine cylinders, a communication between said pipes and a source of fluid supply, an independently operated valve controlling the discharge end of each of said fuel feed pipes, an air feed passage surrounding said heat circulating duct and said air feed passage and said fuel feed pipes discharging into said communications between said fuel feed pipes and the engine cylinders, and a valve controlling the inlet opening of said air feed passage.

7. In a gasifying device for low gravity liquid fuels, the combination with an exhaust pipe of an internal combustion engine, an inlet manifold, a plurality of fuel feed pipes in said manifold, a communication between said pipes and a source of fluid supply, a communication between each of said pipes and an engine cylinder, an independently operated valve controlling the discharge end of each of said fuel feed pipes, a receiving duct through which said fuel feed pipes pass and having its inlet and outlet at the same end of the manifold, valve controlled means in the exhaust pipe adjacent said inlet and outlet of the duct for circulating heated gases from said exhaust pipe through said duct and returning said gases to said exhaust pipe, and a valve controlled air feed passage in said manifold surrounding said heat circulating duct and said air feed passage and said fuel feed pipes discharging into said communications between said fuel feed pipes and the engine cylinders.

In testimony whereof we have signed our names to this specification in the presence of two subscribing witnesses.

STANLEY H. PAGE.
CHARLES J. BELDEN.

Witnesses:
HARRY H. TOTTEN,
D. B. RICHARDS.